Sept. 21, 1943.  S. MELUP  2,330,073
PROCESS OF MANUFACTURING GAS MASKS
Filed Nov. 27, 1940  2 Sheets-Sheet 1

INVENTOR:
Solomon Melup
BY

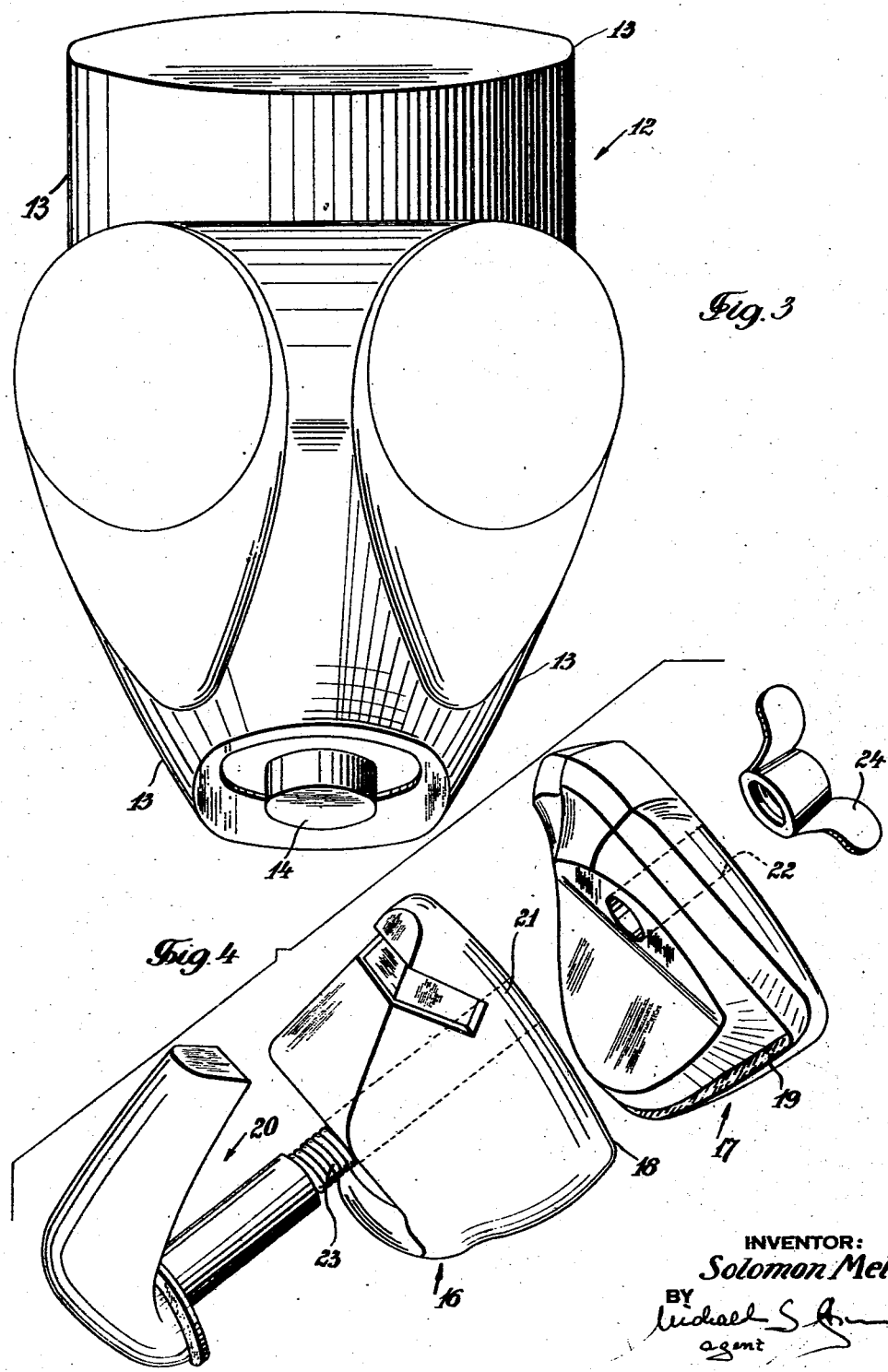

UNITED STATES PATENT OFFICE 2,330,073

PROCESS OF MANUFACTURING GAS MASKS

Solomon Melup, New York, N. Y.

Application November 27, 1940, Serial No. 367,369

5 Claims. (Cl. 18—56)

My present invention relates to a process of producing gas masks as described and claimed in my prior patent application, Serial No. 358,353, filed on September 25, 1940. It more particularly relates to producing gas masks comprising an outer and an inner mask.

The main object of my present invention is the production of masks of first-rate quality at a very low cost.

A further object of my invention consists in a new process which needs no large initial investments for production but can be carried out using relatively simple molds which may be produced quickly and inexpensively.

Still a further object of my present invention consists in a process which makes a speedy production and a large output of gas masks possible.

Another object of my present invention is to avoid considerable amounts of waste of vulcanized rubber as well as of raw materials and chemical products.

In accordance with my present invention I attain these objects by producing the mask bodies on metallic molds instead of in such molds as has been usually done up to now; more particularly, my new process comprises the steps of placing a rubber sheet on a form, the outer surface of which corresponds to the shape of the inner surface of the mask body to be produced, in close contact with this outer surface, and vulcanizing thereafter said mask body shaped rubber sheet on said form.

In accordance with a preferred embodiment of my invention I carry out this process by placing a rubber sheet over a form, the outer surface of which corresponds to the shape of the inner surface of the mask body to be produced, securing said formed rubber sheet to said form in close contact with its outer face, and vulcanizing thereafter said mask body shaped rubber material on said form.

I furthermore propose to carry out the vulcanization in vulcanization boilers by applying to the formed rubber sheets hot air, steam, or hot water. This way of vulcanization is especially simple and easy to be carried out. As the quality of the rubber material, formed and vulcanized in the above described way, is practically not at all affected by the process, the rubber quality of the finished mask body is much higher than that of masks pressed and vulcanized in the usual way; therefore I may use a smaller per cent of rubber in the rubber solution used and need less rubber material, a great advantage in time of war, when these masks are especially needed.

The novel features which I consider as characteristic for my invention are set forth in particular in the appended claims. The invention itself, however, both as to its construction and its method of operation, together with additional objects and advantages thereof will be best understood from the following description of specific embodiments, when read in connection with the accompanying drawings, in which:

Fig. 3 is a perspective view of a form for the outer mask, shown in Fig. 1.

Fig. 4 is an extended view of a combined form for the inner mask shown in Fig. 2.

Figure 1:
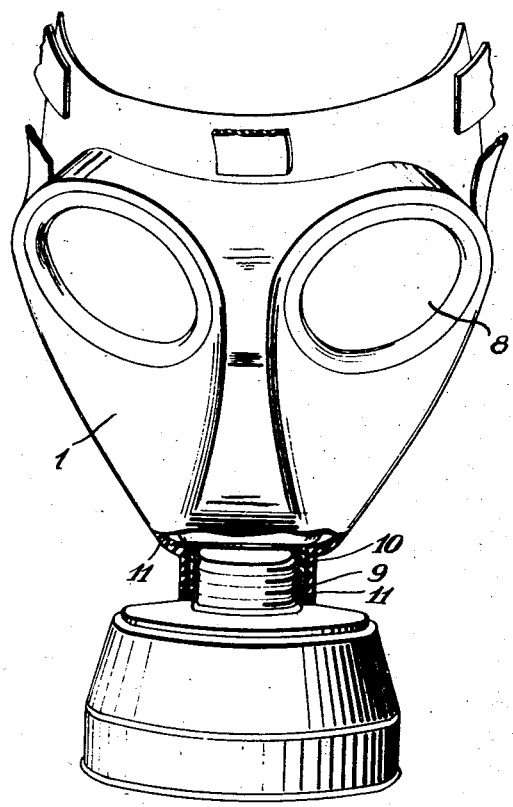
Fig. 1 is a perspective view of the outer gas mask.

In the drawings, as enumerated above, not only the forms used for my new process, but also the inner and outer mask produced by this process are shown, as it seems to be possible only in this way to explain the new process and forms claimed by me with the required exactness.

As these masks form no part of the present application, they have to be described in the following description only so far as to the understanding of the claimed processes and forms necessary thereto.

The outer mask 1 envelopes the entire face of the gas mask wearer; the inner mask 2 is arranged within this outer mask 1, completely surrounding the mouth and nostrils of the mask wearer. A communicating duct 3 is arranged on the inner mask 2 along the central plane of the face; this communicating duct is connected at its lower end by an opening 4 and inlet valve 5 with the space inside said inner mask; the upper end of the communicating duct 3 ends in an opening 6 within the outer mask 1. It is of importance that the communicating duct 3 and the inner mask 2 form an integral unit, leaving open only the upper and lower ends of this duct. In the bottom of the inner mask 2 a further opening 7 is provided for, which opening serves for connecting the space within said inner mask with the outlet valve.

The outer mask 1 is provided, as shown in Fig. 1, with two eye windows 8 and an opening in the lower front part of the mask for connecting the space within said mask with the canister.

This opening is surrounded by a metallic sleeve 9; around the cylindrical outer surface of this metallic sleeve 9 a hemp-string 10 is wound and a textile fabric 11 wrapped around it; the rubber material of the mask body, vulcanized to the sleeve, encloses this hemp-string and textile fabric and forms an air-tight connection between the sleeve and the gas mask body. This part of the mask is most subjected to wear and therefore it is very important that I am able to provide for such an excellent connection between mask and canister. This cannot be done in a gas mask made in forms as used up to now. The textile fabric 11 reaches into the body itself, thereby serving as reinforcement for the body portions around this sleeve.

Having thus shortly described preferred embodiments of masks to be produced by my process, I will proceed with the description of the new forms used for making these masks.

In Fig. 3, the form 12 for the outer mask is shown; it is evident that the outer surface of this mask form has to correspond to the shape of the inner surface of the outer mask to be produced on this form. The process of producing this mask is described above in detail: a rubber sheet is placed over the entire surface of this form and secured around its edge 13 to the form; this rubber sheet thus gets the exact shape of the outer mask; by vulcanizing the thus stretched rubber sheet, together with the form, a permanently shaped gas mask body is produced.

In order to provide satisfactory adhesion between the metal sleeve 9 and the rubber material of the mask, this part of the mask is produced in the following way:

The metallic sleeve 9 is placed on projection 14 of form 12; around this sleeve a hemp-string 10 is wound and a textile fabric 11 is wrapped around this hemp-string. This textile fabric partly also covers the form surface surrounding the projection 14. Over this sleeve, hemp-string, and textile fabric the rubber sheet is stretched, as explained above, and vulcanized thereafter. Thereby, the outer surface of the metallic sleeve, screw-threaded itself, is vulcanized to the rubber material of the mask body and the hemp-string and textile fabric are vulcanized into the rubber material of the mask, serving thus as additional reinforcements, and ensuring airtight and practically unseparable connection between mask body and sleeve.

I have found it advantageous to provide the form before placing or stretching the rubber sheet on it, with a thin coating of rubber; this can be done in any usual way, e. g. by dipping, or the like.

After vulcanization, the necessary openings for the eye windows, connection with the canister, and outlet valve are cut or stamped in the vulcanized mask body; thereafter the body is cleaned and finished and practically ready for use.

Figure 2:
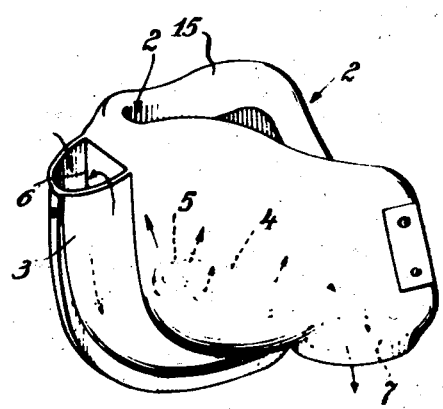
Fig. 2 is a perspective view of an inner mask of a gas mask to be worn within the outer mask show in Fig. 1.

The form for producing the inner mask, shown in Fig. 2, is not such a simple one as the form for producing the outer mask; this is caused by the fact that the inner mask has an edge portion 15 being turned inward and consists of a main body and an additional communicating duct.

Therefore, I use for producing this inner mask a form consisting of three form members: the first form member 16 has an outer surface corresponding to the shape of the inner surface of the main body of the inner mask itself; the second body member 17 is shaped in such a way as to be adapted to press against this first form member 16 along its edge 18 and to form between both members a slit 19 for the inward-turned edge portion 15 of the rubber sheet of which the mask body is made; thus, this member is adapted to cooperate with the edge portion 18 of the first member 16 in such a manner as to hold the overlapping edge portion of a rubber sheet stretched over the outer surface of this first member turned inward, as required for the finished mask body; the third form member 20 has a shape corresponding to the inner volume of the communicating rubber duct 3. As shown in the drawings, in the first and second form members 16 and 17, corresponding openings 21 and 22 are provided for; a screw-threaded extension 23 is provided at the third form member 20; these openings 21 and 22 and the screw-threaded extension 23 are arranged in such a manner that the three form members are in the required position to each other when the extension 23 is passed through both openings in the other members and fixed in this position by a nut 24, or the like. It should be noted that it is also possible to provide for attaching these three form members to each other separate means, e. g. screws, bolts, or the like.

This combined form is used for producing the inner mask body in the following way: first, a main rubber sheet is placed over the outer surface of the first member 16; this main rubber sheet has an opening corresponding to the opening 21 in this first form member; then extension 23 is passed through this opening and thus the third member 20 placed in close contact with the outer surface of the main rubber sheet placed over the first form member 16; thereafter, an additional rubber sheet is stretched over the outer surface of the third form member 20 and secured, e. g., by applying an adhesive along the edges of this third form member to the outer surface of the main rubber sheet placed over the first form member; then the main rubber sheet is stretched over the edge portion 18 of the first form member 16 and secured in its stretched position by the second form member 17 pressing against this edge; as last step for shaping the rubber sheets which are to form the mask body, the nut 24 is screwed upon extension 23 and thereby the three members fixed together.

After vulcanizing the thus stretched rubber sheets on the form as described above, the inner mask body is substantially ready for use.

Although I have described my invention only in connection with producing gas masks of a specific type, and although I have described only specific forms of producing these masks, I want to emphasize and to stress that I do not want in any way to be limited to the specific embodiment of my invention shown in the drawings, and described above: I claim as my invention also the generic process of producing gas masks, and the forms thereto, as claimed in the appended claims.

It will be understood that each of the elements described above, or two or more together, may also find a useful application in other types of forms of gas masks differing from the types described above.

I want to add that, as shown in the drawings, I provide in the form member 16 a recess for a metal strip member serving for adjusting the nose portion of the inner mask to the face of the gas mask wearer. After enveloping this metal strip into textile fabric I place it into this recess before placing a rubber sheet over the form 16; thereafter, I vulcanize it to the inner surface of the mask serving thus as reinforcing and shaping member.

I want to note that my invention also comprises all methods by which a rubber coating is formed on a metal form having a surface corresponding to the shape of the gas mask body to be formed. Thus, my present invention also comprises the method of dipping a metallic form into latex or similar material, and forming the gas mask bodies in this way. I want to stress that my invention also covers all methods by which the rubber material is applied to the metallic form by spray guns or the like.

While I have described one embodiment of my invention, i. e., the process in which I use unvulcanized rubber sheets for forming the mask bodies, I do not intend to be limited to the details shown, since various modifications, e. g., all processes mentioned above and also other methods, may be used without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore such adaptations should and are intended to be comprehended within the meaning and range of equivalency of the following claims.

What I claim as new and desire to secure by Letters Patent is:

1. Process of producing a rubber gas mask consisting of a main mask body and an additional mask body forming a duct on the outer surface of said main body, said process comprising the steps of placing a main rubber sheet over a main form, the outer surface of which corresponds to the shape of the inner surface of said main mask body to be produced, placing an additional form corresponding in shape and size to the volume of said duct on the respective part of the outer surface of said main rubber sheet on the main form, placing an additional rubber sheet over the outer surface of said additional form and securing the sheet along the edges of said additional form to the outer surface of said main rubber sheet, and vulcanizing thereafter said main body shaped rubber sheet and said duct-shaped additional rubber sheet secured to each other on said forms.

2. Process of producing a rubber gas mask consisting of a main mask body and an additional mask body forming a duct on the outer surface of said main body, said process comprising the steps of stretching a rubber sheet over a main form the outer surface of which corresponds to the shape of the inner surface of said main mask body to be produced, securing an additional form corresponding in shape and size to the volume of said duct to the respective part of the outer surface of the stretched rubber sheet on the main form in close contact with the outer surface of said stretched main rubber sheet, stretching an additional rubber sheet over the outer surface of said additional form and securing the sheet along the edges of said additional form to the outer surface of said stretched main rubber sheet, and vulcanizing thereafter said main body shaped rubber sheet and said duct-shaped additional rubber sheet secured to each other on said forms.

3. Process of producing a rubber gas mask consisting of a main mask body and an additional mask body forming a duct on the outer surface of said main body, said process comprising the steps of stretching a rubber sheet over a main form, the outer surface of which corresponds to the shape of the inner surface of said main mask body to be produced, placing an additional form corresponding in shape and size to the volume of said duct on the respective part of the outer surface of the stretched rubber sheet on the main form, stretching an additional rubber sheet over the outer surface of said additional form and securing, by applying an adhesive between the overlapping sheet portion, said stretched additional sheet along the edges of said additional form to the outer surface of said stretched main rubber sheet, and vulcanizing thereafter said main body shaped rubber sheet and said duct-shaped additional rubber sheet secured to each other on said forms.

4. In the process claimed in claim 2, the step of producing a thin rubber-coating on the outer surface of the form before stretching the rubber sheet over it.

5. In the process claimed in claim 2, the step of dipping the outer surface of the form into a thin rubber solution before stretching the rubber sheet over it.

SOLOMON MELUP.